United States Patent [19]

Seefeld et al.

[11] 4,227,654
[45] Oct. 14, 1980

[54] BALE PROCESSOR

[75] Inventors: Dean E. Seefeld; David K. Schirer, both of West Bend, Wis.

[73] Assignee: Gehl Company, West Bend, Wis.

[21] Appl. No.: 950,975

[22] Filed: Oct. 13, 1978

[51] Int. Cl.$^3$ ............................................. B02C 18/18
[52] U.S. Cl. .................................. 241/34; 241/101 A; 241/101.7; 241/282.1
[58] Field of Search ............... 241/101 A, 277, 278 R, 241/278 A, 279, 280, , 281, 33, 34, 36, 101.7, 282.1, 243, 245, 282.2

[56] References Cited

U.S. PATENT DOCUMENTS

| 2,763,306 | 9/1956  | Skromme ........................ 241/245 |
| 3,039,505 | 6/1952  | Mast ............................. 241/282.2 |
| 3,186,651 | 6/1965  | Briolini .......................... 241/243 X |
| 3,305,621 | 5/1962  | Burcham ........................ 241/101 A X |
| 3,773,269 | 11/1973 | Brooks et al. .................. 241/101 A X |
| 4,078,640 | 3/1978  | Nickel et al. .................. 241/101.7 X |
| 4,088,272 | 5/1978  | Grillot .......................... 241/101 A X |

FOREIGN PATENT DOCUMENTS 2618942 11/1977 Fed. Rep. of Germany ........ 241/101.7

Primary Examiner—Mark Rosenbaum
Attorney, Agent, or Firm—Andrus, Sceales, Starke & Sawall

[57] ABSTRACT

A bale disintegrating apparatus provides a cutter having a plurality of blades extending outwardly from an axis directed generally towards the bale with such knives being rotated about the axis for cutting the fibrous material at a face of the bale. A spider rotates about an axis generally directed towards the bale while one or more of the cutters are mounted to the spider for rotation at axes spaced from the spider axis and cut along the face of the bale. A quill is mounted upon the rotary shaft of the spider and is coupled to operate a cutter at a speed substantially different than the spider speed. The cutter is angularly oriented with respect to the spider while the spider is angularly spaced from a plane normal to the relative movement direction between the bale and the cutting assembly. A chamber surrounds the cutting assembly and a discharge conveyer while constricting panels confine the bale to be properly addressed to the cutting assembly. The length of cut is selectively varied by regulating the speed of relative movement between the bale and the cutting assembly, the angular speed of the spider, and the spacing between knives on the cutter. A bale lift functions with a control sensing the conveyor position for coordinated operation. A series of manually operable trip cord activated power disconnects function to de-energize the bale carrying conveyor and the cutting assembly for safe operation.

15 Claims, 14 Drawing Figures

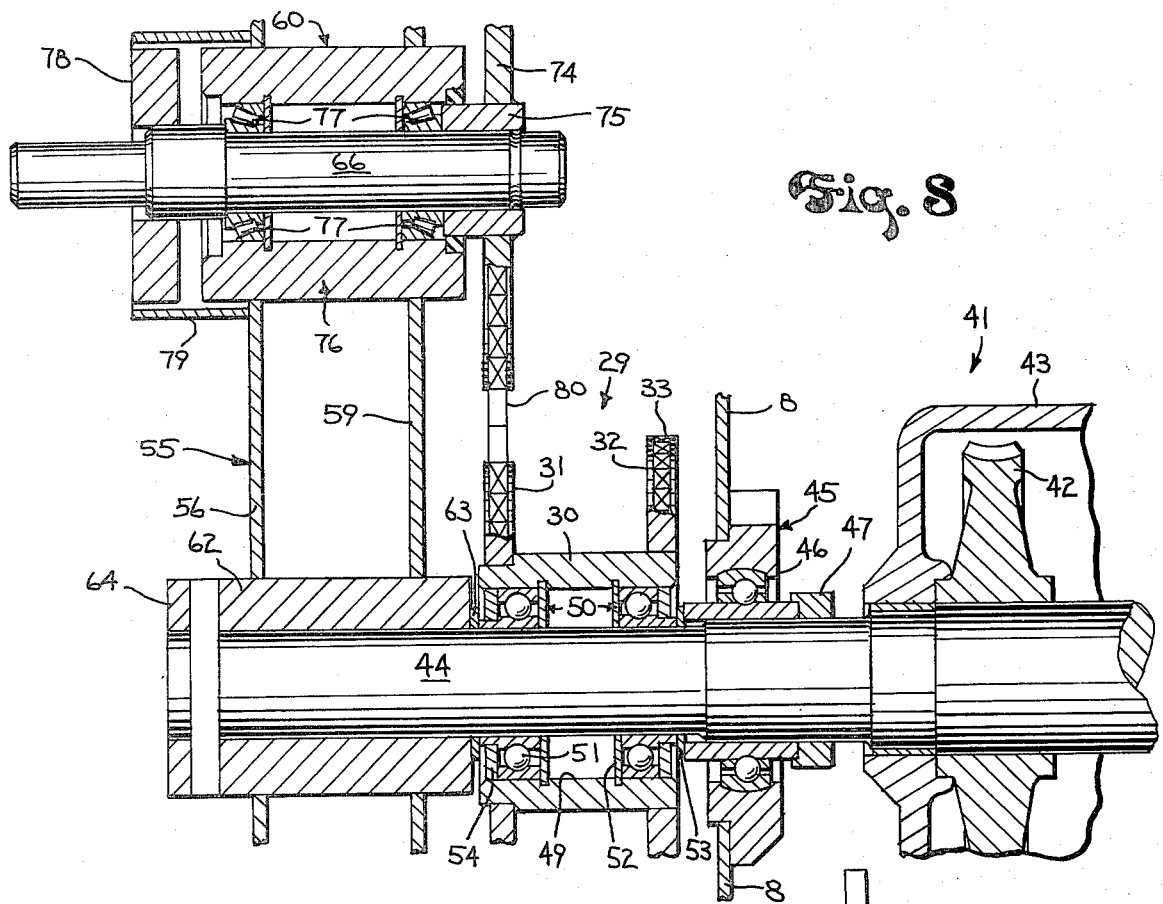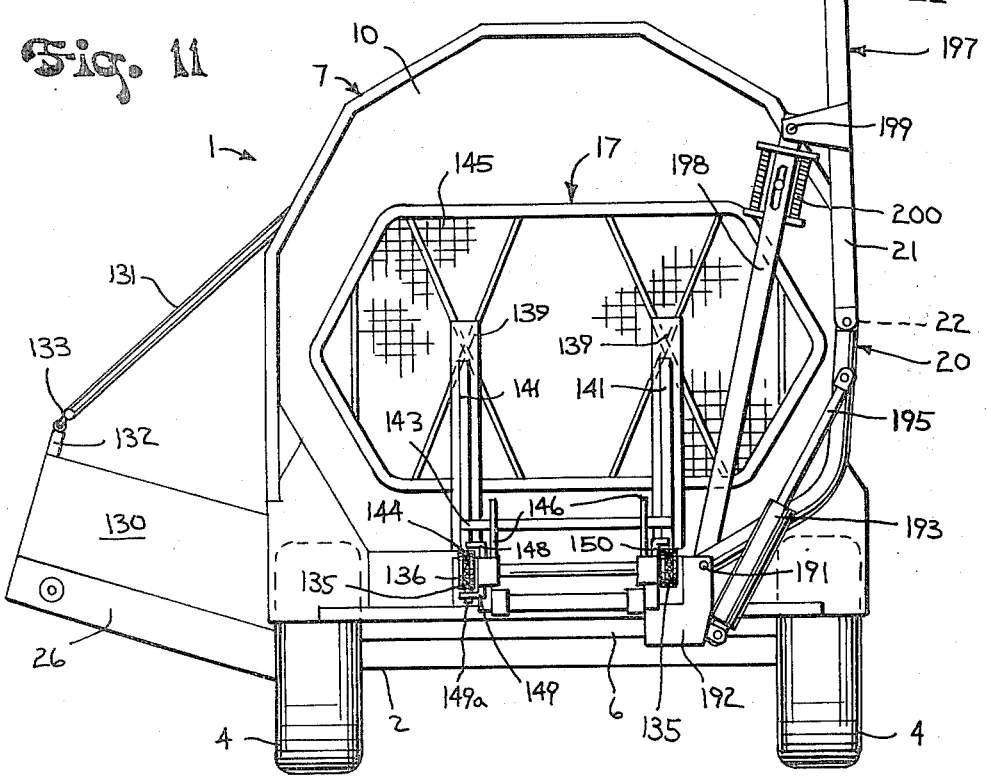

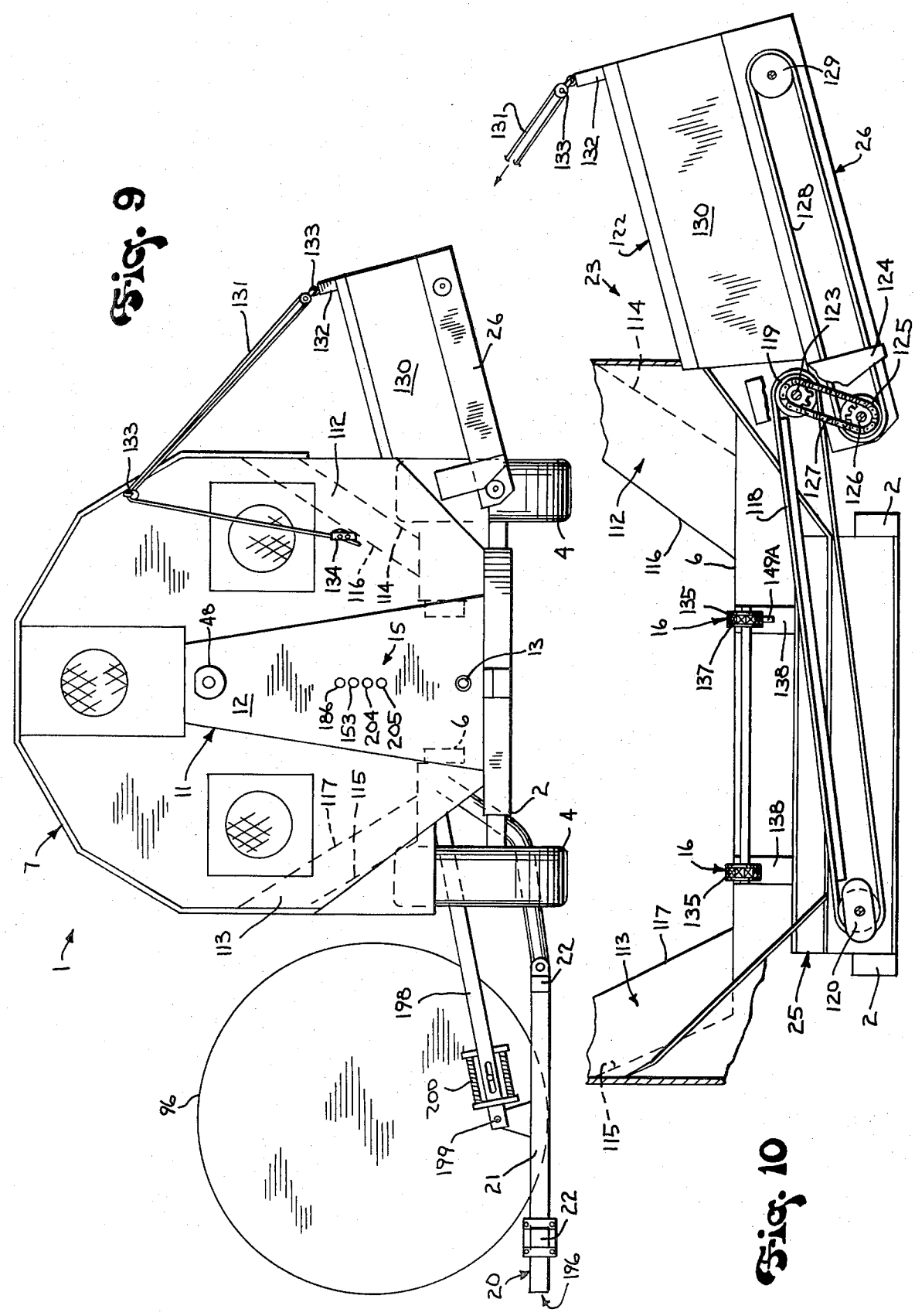

BALE PROCESSOR

BACKGROUND OF THE INVENTION

This invention relates to an apparatus for disintegrating a bale of fibrous material.

Throughout the years, fibrous material has been collected and stored in a variety of forms for later use in a variety of applications. For example, animal food stuffs may be collected in a mass either loosely held together under its own weight as in a stack or bound by twine or other securing means as in a cylindrical rectangular or other configuration. As used in this invention, the term bale shall include any type of fibrous material which is in a collective configuration irrespective of whether it is bound by twine or loosely forming a stack. When collected to form a bale, such fibrous material may be stored or transported or both for use at the same or different location or at a later time for a variety of purposes including animal feed, bedding, etc.

A variety of methods and machines have been developed over the years for converting a bale of fibrous material into disintegrated form. Such machines have included a variety of hoists for lifting the bale from the ground and placing it upon the machine where the bale is shredded or cut with the disintegrated fibrous material thereafter being discharged either at a stationary point or linearly as the machine is moved across the ground.

Many of such machines have involved complicated cutting or shredding assemblies wherein the fibrous materials frequently become clogged and/or wherein the disintegrated fibrous material is frequently found to be of non-uniform particle size.

SUMMARY OF THE INVENTION

This invention relates an apparatus for disintegrating a bale of fibrous material.

In one aspect of the invention, a cutter includes a plurality of blades extending outwardly from an axis directed generally towards a bale and such plurality of blades are rotated about such axis. Relative movement is provided between the bale and the cutter so that the revolving blades are selectively engaged against the bale for cutting the fibrous material by such blades at a face of the bale.

In another aspect of the invention, a spider is connected to a supporting structure for rotation about a first axis directed generally towards the bale. The cutter, in turn, is rotatably connected to the spider for selective rotation about a second axis also directed generally towards the bale. Both the spider and the cutter are rotated while relative movement is provided between the bale and the rotary cutter for engagement of the bale by the rotary cutter as it rotates about the first axis for disintegrating the bale and providing disintegrated fibrous material.

In a further aspect of the invention, the supporting structure includes a bed connected to an enclosure which forms a chamber at a first end of such bed. A conveyor is placed upon the bed and provides a first conveyor end within the chamber and a second conveyor end spaced from the chamber. A cutting assembly including the rotating spider and the rotating cutting head are located within the chamber and adjacent to the first conveyor end. In operation, operating power is applied for rotating the spider and the cutting head and for operating the conveyor so that a bale is conducted along the conveyor toward and into the cutting assembly so that a rotating knife provided by the cutting head cuts fibrous material along the face of the bale.

A highly desirable structure for disintegrating a bale of fibrous material is provided by cutting at or along a face of the bale. In such manner, a shearing action occurs which provides a clean cut resulting in disintegrated fibrous material of uniform length. In that the shearing action occurs in a plane transverse to the direction of relative movement between the bale and cutting assembly, a variable regulation of the length of cut is possible by controlling the speed of relative movement or the angular speed of spider rotation or both.

The plurality of blades provided by the cutter rotate within a cutter plane which is angularly spaced from the bale face so at least one of the cutting blades is spaced in relief from the bale face when another of the cutting blades is cutting the bale. Such relief permits cut fibrous material to be discharged from the cutter through the relief area for a highly efficient operation. An angular spacing of approximately three degrees between the cutter rotating plane and the spider plane has been found desirable in the illustrated embodiment although other angular spacings could also be provided to meet varying applications.

The cutter includes a plate having a concave outer surface formed about the cutter axis and generally faces the bale. An outer edge of the plate provides a plurality of mounting projections. With such construction, the cutting blades are removably connected to selected mounting projections so that the blades extend radially from the axis of the cutter and axially outward from the plate and toward the bale. A recess is provided along the outer edge of the cutter plate between adjacent blades for permitting cut fibrous material to be discharged from the cutter through such recess.

A blade of the cutter includes a substantially triangularily shaped portion providing a pair of oppositely facing side cutting edges which communicate with an outwardly disposed end cutting edge positioned substantially normal to a radius of the plate. One of the side cutting edges intersects with the end cutting edge and forms a cutting point which functions for cutting the fibrous material along the face of the bale.

As previously mentioned, the length of cut for the fibrous materials is closely regulated and may be selectively varied to provide a highly accurate control. In one sequence of operation, the speed of the bale carrying conveyor is selectively varied to thereby vary the advance speed of the bale into the cutting assembly. The conveyor is operated by a hydraulic motor through the controlled supply of hydraulic fluid between a hydraulic source and reservoir and the hydraulic motor. A hydraulic control includes a variable valve which is controlled for selectively by-passing pre-selected portions of the hydraulic fluid from the fluid source to the fluid reservoir thereby by-passing the hydraulic motor. Thus by controlling the amount of fluid under pressure flowing to the hydraulic motor, the speed of such motor and therefore the speed of the bale carrying conveyor can be selectively regulated. The regulation of the conveyor speed, in turn, regulates and controls the length of cut of fibrous materials by controlling the bale speed into and through the cutting assembly.

The length of cut can also be selectively controlled by adjustably pre-selecting the speed of rotation for the spider. In such manner, the variance of the angular speed of rotation of the rotary cutter varies its progression along the bale face and the length of cut thereby varies for a given predetermined speed of relative movement between the cutting assembly and the bale.

The length of cut for the fibrous material may also be varied by adjustably spacing the distance between knives of the rotary cutter. An increased spacing between adjacent knives of a cutter will increase the length of cut while a pre-selected closer spacing between adjacent knives will decrease the length of cut.

In another aspect of the invention, the bale is confined as it proceeds toward and into the cutting assembly. Such confining maintains at least a portion of the bale in a compact or restricted configuration and facilitates a smooth and clean cut by the cutter at the face of the bale. Such confining may be provided by an enclosure which provides first and second confining portions generally extending along a portion of the conveyor and include a first position for initially engaging the bale as it progresses along the conveyor and tapers to a final position immediately adjacent to the cutting assembly. Such taper tends to compress at least a portion of the bale and affirmatively addresses the bale in a confined or semi-confined state to the cutting assembly for a clean cut. In such manner, the first and second portions taper toward each other and provide a greater restriction at the final position immediately adjacent the cutting assembly.

A paddle is connected to the rotary spider and extends within the chamber in an outward direction towards the enclosure and to a location spaced radially outward from the arc of the cutter. Such paddle operates to conduct disintegrated fibrous material away from the path of the rotary cutter and towards a discharge conveyor located at a lower portion of the chamber.

The discharge conveyor includes a first conveyor portion located immediately adjacent the cutting assembly and at the lower portion of the chamber. A second conveyor portion is hingedly mounted to receive the output of the first conveyor portion and is rotatable between a maximum lower position and a maximum upper position for providing a varying height discharge point for the disintegrated fibrous materials to be discharged from the disintegrating assembly.

The rotating spider which supports the rotary cutter rotates within a plane which is angularly spaced from a reference plane normal to a bale movement axis. The cutter thus revolves with the spider and within a disintegrating plane parallel to the spider plane. The upper portion of such disintegrating plane is therefore canted towards the bale which permits an extremely desirable cutting sequence at the terminal end of the bale disintegration sequence by preventing the upper bale portion from toppling or crumbling to eliminate possible clogging of the cutting apparatus and provide a continued clean cut. An angle of approximately fifteen degrees for such canting has been found to be desirable although other angles may be provided within the scope of the invention.

Operating power is supplied to rotate one or more rotary cutters through a quill mounted upon a rotary shaft of the spider. Such quill construction provides an output coupled to drive the one or more rotary cutters at a first pre-determined speed even though the interconnected rotary shaft of the spider operates at a second substantially different speed. Such mechanical coupling has been found to provide highly efficient operation in a compact cnfiguration.

In a preferred form of the invention, a plurality of cutters are connected to the spider at spaced locations. In such construction, one cutter is spaced by a first pre-determined distance from the spider axis and operates within a first pre-determined bale disintegrating area. Another cutter is mounted to the spider for selective rotation about another axis which is spaced by a second pre-determined distance from the spider axis and operates within a second pre-defined bale disintegrating area different than the first area. It is understood that any number of rotary cutters may be mounted to the rotating spider in accordance with the desired operation and the balancing of the rotating system.

In the illustrated embodiment of the invention, three rotary members are spaced at pre-determined distances from the spider axis along three corresponding radial lines which are substantially equally circumferentially spaced. In such construction, one rotary cutter is spaced by a first pre-determined distance from the spider axis while the other two rotary cutters are spaced from the spider axis by a second pre-determined distance different than the first distance. Two pre-defined cutting areas are therefore provided which have been found to provide a highly efficient and balanced operation.

In another aspect, the bale carrying conveyor includes a reversible drive and a false-end gate which is selectively operable between the first position adjacent the cutting assembly and a second position remotely spaced external to the chamber. In operation, the conveyor operates to transfer the false-end gate away from the cutting assembly and to the second position for receiving a bale upon the conveyor bed and thereafter selectively operates toward the first conveyor position for engaging and moving the bale toward and into the cutting assembly for disintegration of the bale.

The false-end gate is pivotally mounted to a continuous conveyor chain and selectively rotates between a canted bale engaging position and a substantially normal position with respect to the conveyor bed as it is positioned at the second conveyor position. A cam follower selectively engages a cam surface connected to the conveyor bed and responds to the false-end gate moving to the second conveyor position for rotating the false-end gate from the canted position to the substantially normal position for permitting a safe operation of a bale lift.

The bale lift provides a control including a switch located adjacent to the conveyor and operable to a first position in response to the false-end gate being located at the second conveyor position for permitting the selective operation of the bale lift. Such switch is further operable to a second position in response to the false end gate being positioned at a location spaced from the second conveyor position for disabling the bale lift.

A multiplicity of safety features are also provided for disabling certain aspects of the disintegrating apparatus. For example, a safety valve is provided in the fluid control circuit which controls the operation of the conveyor hydraulic motor. Such safety valve is provided with a manually operable trip cord which is exposed externally to the cutting assembly and is operable between a first condition permitting operation of the conveyor and a second condition de-activating the conveyor in response to the manual activation of the trip cord. Another safety feature includes a safety interlock provided in the power transmission coupling to the cutting assembly. Such safety interlock provides a manually operated trip cord which is exposed externally to the cutting assembly. Such safety interlock is operable between a first condition permitting rotation of the spider and the cutting head and a second condition de-activating the cutting assembly in response to the manual activation of the trip cord.

The invention may be used in a variety of situations for providing a variety of results. For example, without limitation, the disintegrating assembly may be permanently mounted at a fixed location where a continuous uni-directional conveyor progressively feeds a series of bales to the cutting assembly. In such operation, each succeeding bale engages a preceeding bale and operates as a "false-end gate" to prevent the upper trailing edge of a bale from toppling rearwardly as it nears the cutting assembly. Alternatively, wheels or other traction means may be provided to the disintegrating assembly for movement across the ground. In such mode, one or more bales may be placed upon the bale carrying conveyor with the entire assembly being mobile to transport such bales to a different location. Such mobile disintegrating assembly can process the bales while positioned stationary at a preselected discharge point or may be operated while under movement to provide a linear discharge of the cut fibrous material. Such operation during movement permits a disintegrating operation for continuously discharging the cut fibrous materials along a linear path as in the field or within a feed bunk. Alternatively, the cut fibrous materials may be discharged at a stationary point into another conveyor system for transportation into a storage structure or other fibrous distribution system. A large number of further operations and applications can be undertaken with the invention and the foregoing examples are submitted for illustration only without limitation.

BRIEF DESCRIPTION OF THE DRAWINGS

The drawings furnished herewith illustrate the preferred constructions of the invention in which the above advantages and features are clearly disclosed as well as others which will be clear from the following description.

In the drawings:

FIG. 2 is a side elevational view of the bale processor of FIG. 1 with parts broken away;

FIG. 8 is a side elevational sectioned view of a drive assembly coupling the cutting assembly of FIG. 3 to a power input source having a selectively rotatable power input shaft;

FIG. 9 is a front elevational view of the bale processor of FIG. 1;

FIG. 10 is a sectional view taken along lines 10—10 in FIG. 2 and showing the discharge conveyor system;

FIG. 11 is a rear elevational view of the bale processor of FIG. 1;

DESCRIPTION OF THE PREFERRED ILLUSTRATED EMBODIMENT

Figure 1:
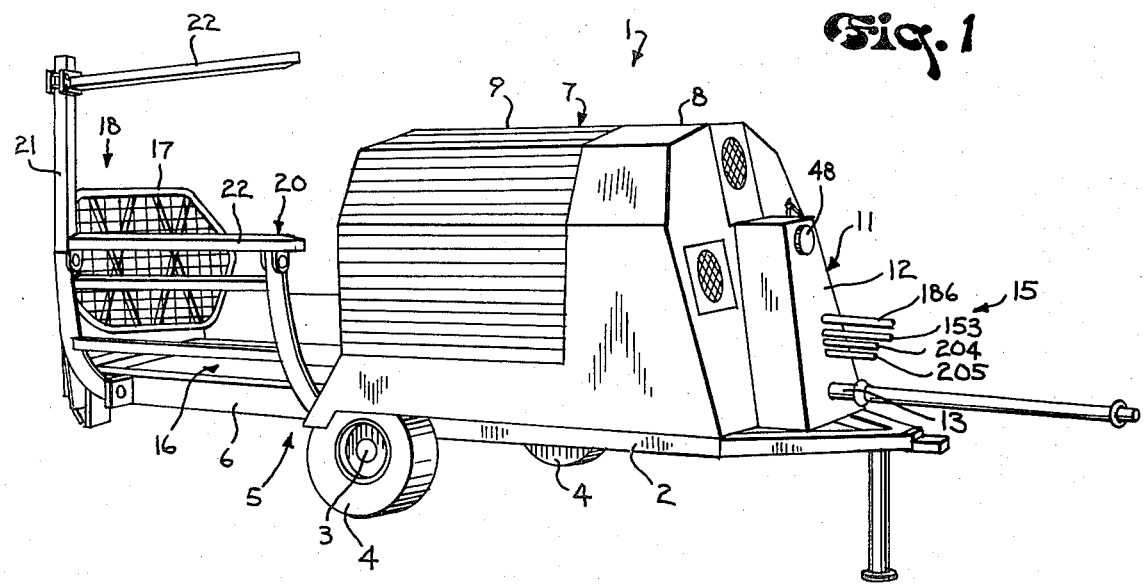
FIG. 1 is a perspective view of a mobile bale processor incorporating the present invention.
Figure 3:
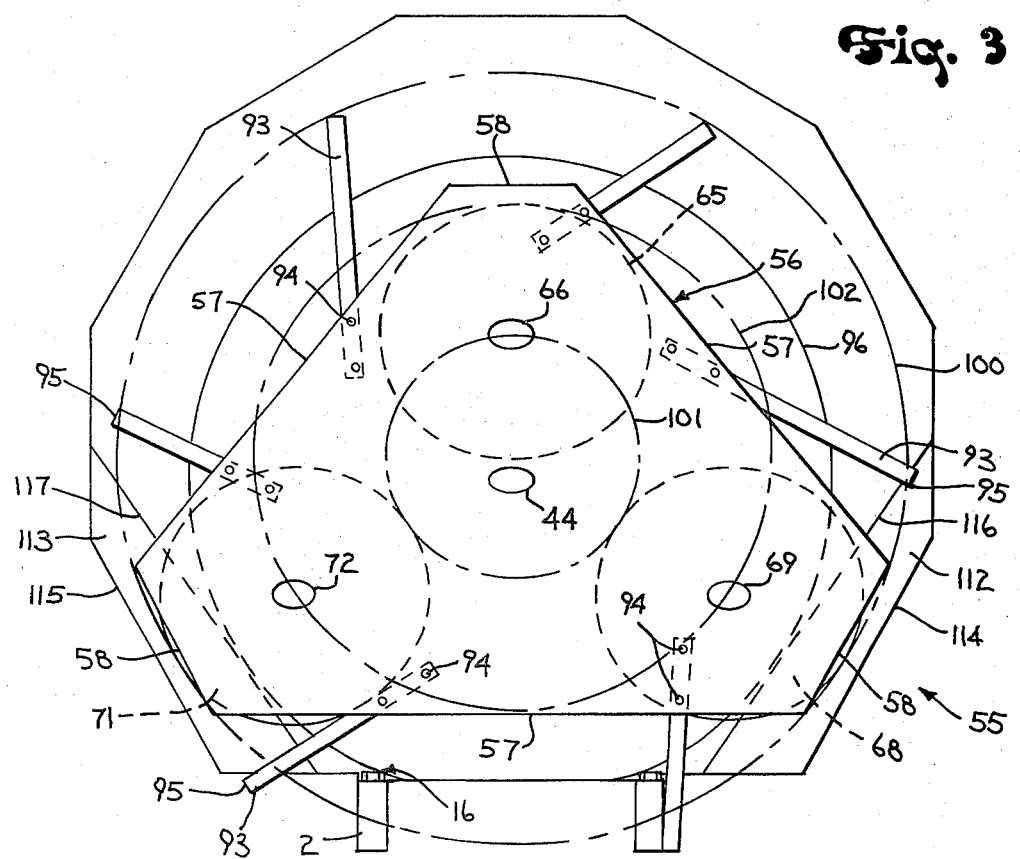
FIG. 3 is a sectional view taken along lines 3—3 in FIG. 2 with parts broken away for illustrating the relationship between the cutting assembly and a bale to be processed.
Figure 4:
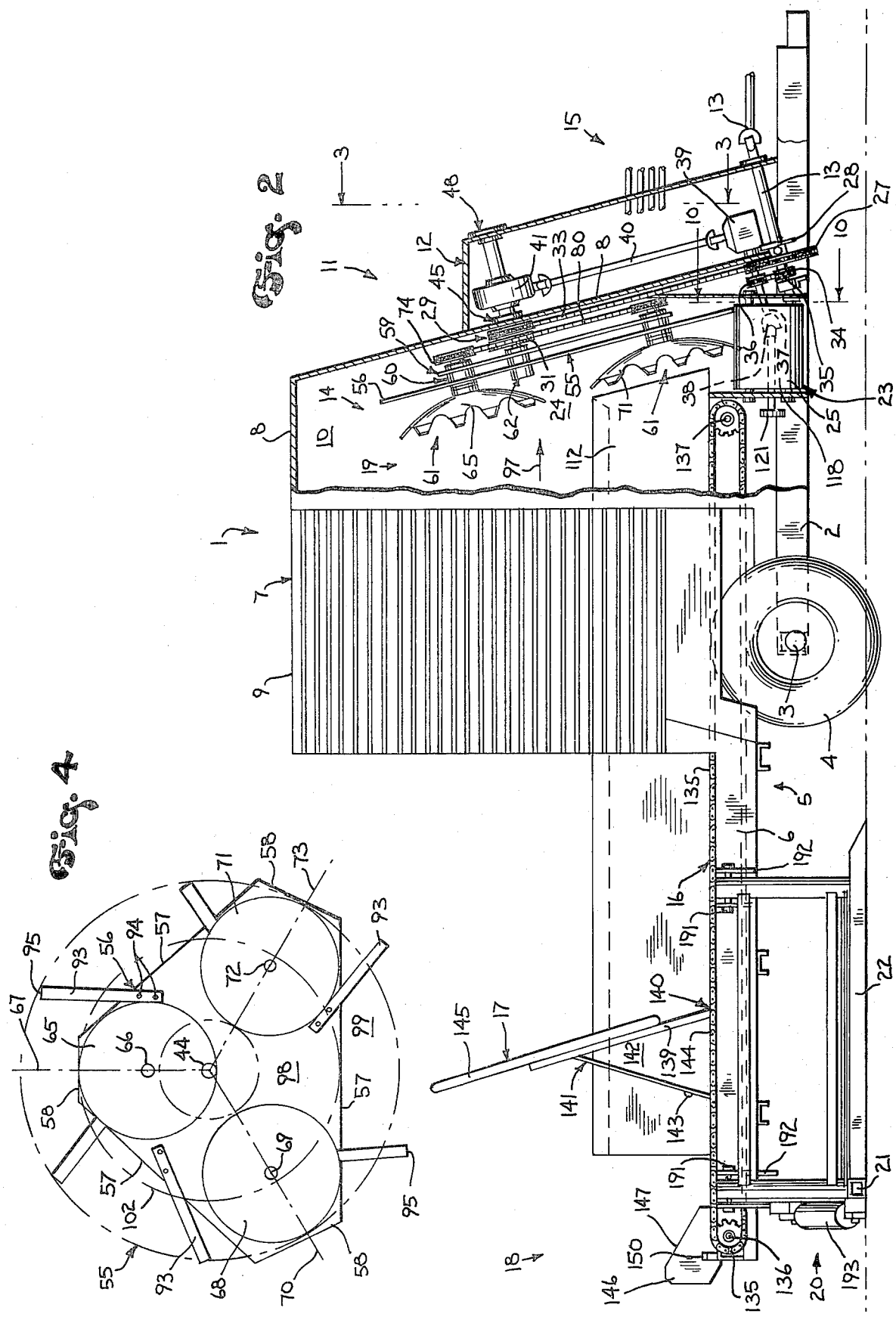
FIG. 4 is a diagrammatical illustration showing the relationship of the cutting paths of individual cutters with respect to a rotating spider of the cutting assembly of FIG. 3 and taken at the normal to a plane containing the rotating spider as viewed from the bale supporting conveyor.

Referring to the drawings and particularly to FIGS. 1-13, a bale processor 1 includes a frame 2 supported upon the ground for movement across a field or the like through one or more axles 3 and associated wheels 4.

A housing 5 is mounted upon frame 2 and includes a bed 6 supporting a shroud 7 providing a front portion 8 and a rear corrugated portion 9. The shroud 7 in conjunction with bed 6 forms a chamber 10 for receiving fibrous material to be processed. Specifically, the shroud 7 forms a substantially semi-circular enclosure and is particularly adapted for receiving large circular bales of fibrous materials such as straw, hay or the like which are to be disintegrated into finely cut particles of desirable length suitable for feeding to farm animals or for other uses such as bedding, etc.

A front portion 11 of the bale processor 1 includes a drive-housing 12 which contains coupling elements for receiving operative power from an input shaft 13 which may be coupled to a power take-off from a tractor or any other suitable power source. The coupling elements within the drive housing 12 operate to transfer operative power from the input shaft 13 to a cutting assembly 14 located within chamber 10. A series of hydraulic hoses 15 supply operating fluid power from a tractor or other suitable hydraulic source for operating a conveyor 16 and a hydraulic lift.

The conveyor 16 is mounted upon bed 6 and is selectively operated to move a bale to be processed into the chamber 10 for disintegration by the cutting assembly 14. The conveyor 16 includes an attached false-end gate 17 which reciprocates between a rearward position as at 18 and a forward position as at 19, the latter being immediately adjacent to the cutting assembly 14. The forward portion of the conveyor 16 is located within chamber 10 while a rear portion extends outwardly from the shroud 7 for a substantial distance.

A hydraulic lift 20 is pivotally mounted to bed 6 and includes an upwardly extending arm 21 which reciprocally operates between a lower position where one or more forwardly extending arms 22 may engage a bale while positioned on the ground and an upper substantially vertical position as illustrated in FIG. 11 for permitting the bale to descend through gravity upon the conveyor 16.

A discharge conveyor system 23 is mounted upon frame 2 and includes two interrelated conveyor units including a fixedly mounted conveyor 25 which extends immediately below the chamber 10 and a pivotally mounted conveyor 26 which extends outwardly from one side of bale processor 1. The conveyor 25 is positioned within a forward portion 24 of chamber 10 and immediately below the cutting assembly 14. The conveyor 26 may be selectively adjusted to different heights for conducting cut fibrous material to a discharge point for deposit in any one of a number of suitable locations.

In operation, the hydraulic lift 20 of the processor 1 is selectively lowered to a position level with the ground. The processor 1 is thereafter moved forward and arms 22 slide beneath a bale resting on the ground. The lift 20 is operated to hoist the bale upwardly to a position where the bale descends by gravity to the conveyor 16. Forward movement of the conveyor 16 causes the false-end gate 17 to engage and thereafter push the bale forward toward and into the disintegrating assembly 14. The assembly 14 disintegrates the bale, as more fully described hereafter, to provide cut fibrous material of a desirable length which descend by gravity into the discharge conveyor 25. The discharge conveyor 25, in turn, conducts the cut fibrous material toward one side of the processor 1 where it is conducted by the pivotal conveyor 26 to a discharge point.

The bale processor 1 may be used in a flexible manner to provide any one of a number of options for efficient usage in handling bales. For example, processor 1 can be used for picking up and transporting one or more bales to a convenient location for processing. The processor 1 can process a bale while moving thereby discharging the cut fibrous material along a linear path. In such manner, processor 1 can simultaneously cut and discharge fibrous material while on the move so as to fill a feed bunk or deposit the feed along a path in an open field for animal consumption. Alternatively, processor 1 may be used in a parked position in which case a bale may be positioned upon the processor 1 by another farm implement and the discharge fibrous materials are deposited at a fixed point. Such mode of operation is ideal for supplying cut fibrous material to another conveyor system or to a blower system for discharge into a storage structure such as a silo, barn or the like or to a feed lot distribution system. Such operational examples are cited for illustration only and many other sequences of operation and application can be provided by the unique bale processor 1.

When coupled for operation, the shaft 13 provides a rotary input to a drive sprocket 27 through a safety clutch mechanism 28, the latter more fully disclosed in U.S. Pat. No. 4,078,640 which was issued on Mar. 14, 1978, and is assigned to a common assignee herewith. A double sprocket assembly 29 includes a quill 30 fixedly connected to an output sprocket 31 and a spaced input sprocket 32, the latter connected to sprocket 27 through a chain 33.

A sprocket 34 is mounted upon the input shaft 13 and is coupled through a chain 35 to a sprocket 36 mounted upon a drive shaft 37. A pivotal coupling 38 is mounted upon one end of the drive shaft 37 and supplies operating power to the discharge conveyor system 23. A bevel gear type transmission unit 39 receives an input from the drive shaft 37 and provides a rotary output through shaft 40 to a worm gear type transmission unit 41. A worm gear 42 is mounted within a housing 43 of the transmission unit 41 and is connected to rotate a drive shaft 44 which extends through the internal opening of the quill 30. The drive shaft 44 is mounted for rotation within a housing unit 45 which includes suitable bearings 46 and an associated locking collar 47 with such housing unit mounted to the front shroud portion 8. A bearing housing 48 is connected to the housing portion 12 and also contains suitable bearings (not shown) for supporting the rotary drive shaft 44.

The quill 30 includes an annular opening 49 which surrounds the rotatable drive shaft 44 through appropriate ball bearing units 50. Such bearing units 50 may comprise conventional commercial units including spherical bearings 51 together with appropriate snap rings 52, washers 53 and seals 54.

The cutting assembly 14 includes a spider 55 having a large panel 56 with three side edges 57 which are interconnected to substantially form a triangle with blunt appexes as at 58. The spider 55 includes a smaller supporting panel 59 which is spaced from panel 56 and interconnected through a series of bearing assemblies 60 which support a series of rotary cutters 61. The panels 56 and 59 of spider 55 are also interconnected through a spider hub 62 which, in turn, is fixedly connected to the rotary shaft 44 through a thrust washer 63 and a lock nut assembly 64. In operation, the entire spider 55 rotates about an axis formed by shaft 44.

The cutting assembly 14 includes three rotary cutters 61 which are interconnected to the spider 55 at spaced locations. Specifically, a cutter 65 is connected to a rotary shaft 66 which, in turn, is supported by spider 55 through a bearing assembly 60. The shaft 66 forms an axis of rotation for cutter 65 and is radially spaced along a radial line 67 by a first predetermined distance from the spider axis provided by rotary shaft 44. Another cutter 68 is connected to a rotary shaft 69 which in turn, is supported by spider 55 through a bearing assembly 60. The shaft 69 forms an axis of rotation for cutter 68 and is radially spaced by a second predetermined distance along a radial line 70 from the spider axis provided by shaft 44. A third cutter 71 is connected to a rotary shaft 72 which, in turn, is supported by spider 55 through a bearing assembly 60. The shaft 72 forms an axis of rotation for cutter 71 and is radially spaced by a third predetermined distance along a radial line 73 from the spider axis provided by rotary shaft 44. In the illustrated embodiment, the second and third predetermined distances which space the rotary shafts 69 and 72 from the rotary shaft 44 are substantially equal and substantially greater than the first predetermined distance which spaces the shaft 66 from rotary shaft 44.

The radial lines 67, 70 and 73 associated with the cutters 65, 68 and 71, respectively, are substantially equally circumferentially spaced.

In that all of the cutters 65, 68 and 71 are connected to the spider 55 in a substantially similar manner, the interconnection for cutter 65 will be described in detail only and it is understood that the other cutters are supported in a like manner. The cutter 65 is secured to the drive shaft 66 by a conventional washer and nut assembly (not shown). A sprocket 74 is connected to one end of the drive shaft 66 through a conventional washer and nut assembly 75. A conventional Timken type bearing assembly 76 interconnects shaft 66 to the panels 56 and 59 of spider 55 and provide roller bearings such as at 77 for permitting the shaft 66 to rotate relative to the spider 55. An annular deflecting ring 78 is mounted upon shaft 66 and is located adjacent to the bearing assembly 76. An annular shield 79 is connected to panel 56 and protectively surrounds the deflecting ring 78. In operation, ring 78 and shield 79 prevent twine from wrapping about shaft 66 and also offers protection to the bearing assembly 76 from the impact of fibrous material.

A continuous drive chain 80 engages all of the sprockets 74 associated with each of the rotary shafts 66, 69, and 72 so that rotation of quill 30 will cause simultaneous rotation of cutters 65, 68 and 71 through sprockets 74, chain 80 and sprocket 31.

Figure 5:
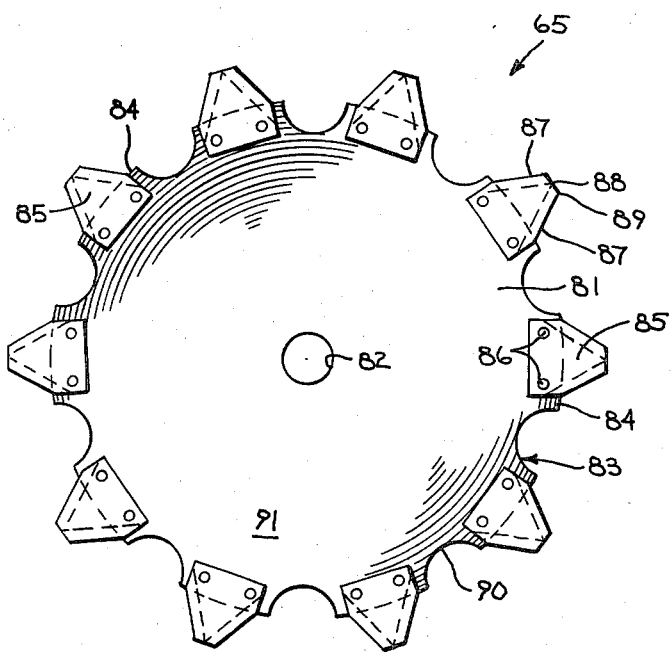
FIG. 5 is a front elevational view of a cutter which has been removed from the cutting assembly of FIG. 3.
Figure 6:
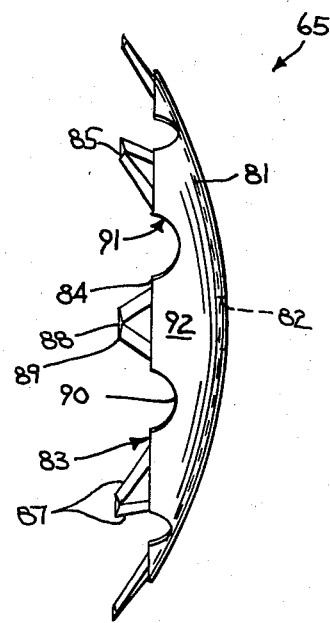
FIG. 6 is a plan view of the cutter shown in FIG. 5.

The cutters 65, 68 and 71 are similarly constructed and cutter 65 is specifically illustrated in FIGS. 5 and 6. The cutter 65 includes a dish shaped plate 81 having a central opening 82 for receiving the rotary shaft 66. The outer circumferential edge 83 of the dish shaped plate 81 includes a plurality of circumferentially spaced mounting projections 84 each removably connected to a sickle type cutter blade 85 which is secured by conventional bolt and nut assemblies 86 or other suitable fastening means. Each cutting blade 85 includes a substantially triangularly shaped portion providing a pair of oppositely facing cutting edges 87 which communicates with an outwardly disposed cutting edge 88. The outer edge 88 is substantially normal to a radial line of the plate 81.

A cutting point 89 is formed between the intersection of one of the cutting edges 87 and the outer cutting edge 88. The circumferential outer edge 83 of the dish shaped plate 81 is recessed at a plurality of circumferentially spaced locations 90 between adjacent cutting blades 85 and permit cut fibrous materials to be discharged from the cutting area while in operation. An outer surface 91 of plate 81 is concave and orientates the cutting blades 85 in an axial outward direction to be directed toward an incoming bale to be disintegrated. An outer surface 92 of plate 81 is substantially equidistantly spaced from surface 91 and thus is convex.

A series of paddles 93 are fixedly connected to the spider 55 through nut and bolt assemblies 94 or other suitable fastening means and project outwardly from the outer edges 57 of the spider 55. Each paddle 93 provides an outer end 95 which extends radially outward with respect to the spider axis provided by shaft 44 to be well beyond the outer periphery of the cutting paths of the cutters 61. In such manner, the paddles 93 extend outwardly toward the outer extremities of chamber 10 and operate to conduct cut fibrous materials to the conveyor 25 mounted below the cutting assembly 14.

In operation, a bale 96 is moved along an axis 97 in response to the moving force provided by the falseend gate 17 of conveyor 16. Input power rotates the shaft 13 which, in turn, rotates shaft 44 through the worm gear unit 41, the bevel gear unit 39 and the sprocket and chain coupling at 34–36. The rotation of shaft 44, as previously indicated, will cause the spider 55 to correspondingly rotate. Simultaneously, quill 30 rotates in response to the rotation of shaft 13 through the coupling provided by sprockets 27 and 32 and the interconnected chain 33. The continuous chain 80 thereby rotates in response to rotation of the output sprocket 31 provided by quill 30 to simultaneously rotate the sprockets 74 and the associated cutter shafts 66, 69 and 72 thus rotating the respective cutters 65, 68 and 71. The rotation of quill 30 will simultaneously rotate all three cutters 65, 68 and 71 at a uniform first predetermined speed of rotation, such as seven hundred and thirty revolutions per minute, for example. The spider 55, however, rotates at a second predetermined speed which is substantially less than the rotational speed of cutters 61. For example, the worm gear type transmission unit 41 and the bevel gear type transmission unit 39 are designed to provide an effective speed reduction coupling between the input power shaft 13 and the spider output shaft 44 to provide the second predetermined rotational speed, such as ten revolutions per minute, for example. Other predetermined first and second predetermined speeds may be provided for varied applications of the invention.

With the spider 55 rotating about the shaft 44, the cutter 65 rotates through a predefined cutting area 98 which is different than the cutting area 98 within which cutters 68 and 71 rotate. For example, an annular shaped cutting area 99 is defined by the cutting path of the cutters 68 and 71 as provided by an outer cutting extremity 100 and an inner cutting extremity 101. On the other hand, a circular cross-sectional cutting area 102 is defined by the cutting path of cutter 65. As illustrated by the view taken at the normal to the spider 55 in FIG. 4, the cutter 65 will cut through the area which is axially aligned with the spider axis provided by rotary shaft 44 so that the entire cross-sectional area within the cutting area 102 will be operatively cut.

The spider 55 is contained within a plane as at 103 which is angularly spaced as illustrated by the angle "A" from a plane as at 104 which is normal to the axis 97 of movement of bale 96 as it travels toward and into the cutting assembly 14. In operation, the spider 55 rotates within plane 103 so that the series of cutters 61, namely, 65, 68 and 71, revolve about the spider axis provided by shaft 44 to provide the cutting areas 98 and 99 as previously defined. With such construction, an extremely desirable disintegrating operation takes place because the upper portion of the bale cross-section is cut before the bottom portion. In such manner, the bottom portion of the terminal or trailing end of the bale is the last portion to be cut. Such operation permits the bale to maintain its confined condition as it progresses toward and onto the cutting assembly 14 to facilitate a clean cut. Thus, the canting of the cutting assembly 14 toward to oncoming bale reduces the possibility of having the upper portion of the trailing end of the bale topple as it nears the cutting assembly 14 which might otherwise cause clogging and result in uncut fibrous material. An angle "A" of approximately fifteen degress has been found to provide a highly desirable cutting operation, although other angles could be provided within the invention for differing applications.

Each of the cutters 65, 68 and 71 are angularly oriented with respect to spider 55. With specific reference to FIG. 7, the shaft 66 forms an axis 105 of rotation for the associated cutter 65. The axis bearing assembly 60 is connected at a slight angular orientation with respect to the spider 55 so that the rotary shaft 66 and associated cutter 65 are slightly angularly oriented with respect to the plane of the spider 55. In such manner, the axis 105 of each cutter is angularly spaced by an angle "B" from the normal 106 taken from the plane 103 containing the spider 55. In other words, a plane 107 which is parallel to the plane of individual cutter rotation is spaced by the angle "B" from the plane 103 containing the spider 55. An angle "B" of approximately three degrees has been found to provide a highly desirable cutting operation, although other angles could be provided within the invention for differing applications.

In operation, the plurality of circumferentially spaced cutting points 89 provided by the cutting knives 85 revolve in a plane parallel to the plane 107 and therefore at an angular orientation (angle "B") with respect to the plane 103 containing the revolving spider 55. In that all three cutters 65, 68 and 71 are carried by the spider 55, they all revolve about the spider axis provided by shaft 44 and therefore within a plane that is parallel to plane 103 containing the spider 55. In such manner, the plane of rotation of the three cutters 61 is at an angular orientation (angle "A") with respect to a plane 104 which is normal to the axis 97 provided by the incoming bale 96.

Figure 7:
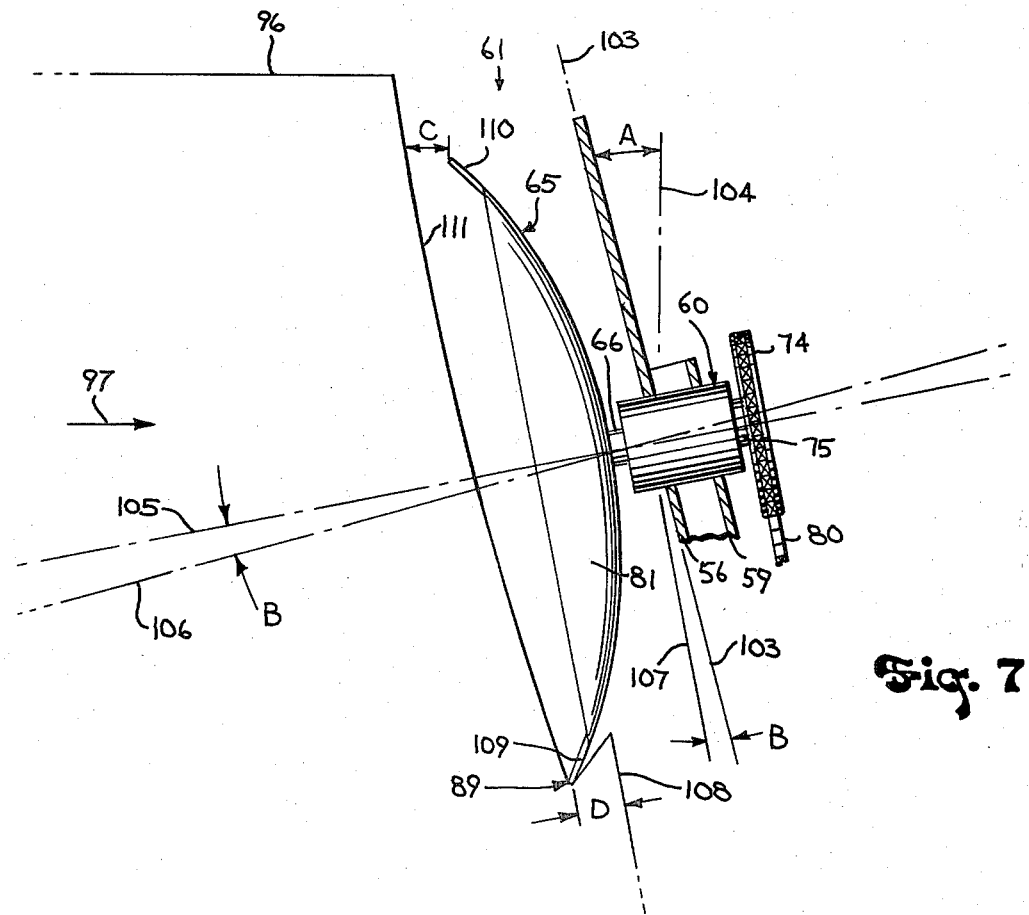
FIG. 7 is a diagrammatic illustration showing a side elevational view with parts broken away of an operational cutter disintegrating a bale.

FIG. 7 illustrates a cutting sequence for the cutter 65 and shows a portion 108 of the incoming bale 96 which is about to be cut by a cutting blade 109 attached to the associated dish shaped plate 81. Specifically, the cut is being made by the blade edge 87 and cutting point 89 while the remaining series of blades such as illustrated at 110 are in varying positions of relief with respect to a previously cut portion 111 of the incoming bale 96. Such relief is illustrated by the distance "C" and permits cut fibrous materials to be discharged away from the cutting area of cutter 65 for allowing a highly desirable cutting sequence without interference from previously cut fibers. The recesses 90 in the disc shaped member 81 further permit cut fibrous materials to exit from the cutting area for an extremely efficient operation.

A pair of restricting guide panels 112 and 113 are secured to opposite sidewalls of the shroud 7. Each of the restricting panels 112 and 113 are connected at an angle with respect to the sidewalls of the processor 1 to provide a tapered restriction at the front portion 19 of chamber 10 for confining the lower portion of a bale 96 as it progresses toward and into the cutting assembly 14. Specifically, the restricting panels 112 and 113 provide rear edges 114 and 115, respectively, and forward edges 116 and 117, respectively. The spaced distance between side edges 116 and 117 is substantially less than the spaced distance between the side edges 114 and 115. In operation, the bale 96 will initially engage the rear edges 114 and 115 of the deflecting panels 112 and 113 as it moves forwardly on the conveyor 16. As the bale 96 continues to move forward, the deflecting panels 112 and 113 will squeeze or confine the lower portion of the bale. The bale 96 is immediately engaged by the cutting assembly 14 as it passes the forward edges 116 and 117 of the confining panels 112 and 113 and is thereby maintained in a confined or restricted condition in order to allow for a clean and unrestricted cut across the oncoming face of the bale 96. The tapered confining panels 112 and 113 thereby confine the lower portion of bale 96 so that it is well within the cutting area 99.

With such confinement of bale 96 by the confining panels 112 and 113, a clean smooth cut can be maintained by the plurality of rotating cutters 61 which, in turn, rotate about the spider axis shaft 44 to provide a unique and extremely desirable cutting sequence for the efficient disintegration of a bale of fibrous materials. The confining panels 112 and 113 are important to provide for the proper addressing of the bale in a semi-confined state so that a smooth and clean cut can be obtained. Furthermore, such panels 112 and 113 prevent clogging of the fibrous material at or near the wall portions of shroud 7. The rotating paddles 93 further enhance the operation by preventing fibrous materials from being lodged or jammed against the sidewalls of shroud 7 and further operate to conduct cut material to the conveyor 25 mounted below the cutting assembly 14.

The conveyor 25 of the discharge conveyor system 23 includes a continuous chain 118 which rotates about a drive sprocket 119 located at an elevated position with respect to frame 2 and a sprocket 120 mounted at about the same elevation with respect to frame 2. The conveyor chain 118 is positioned below the vertical level of conveyor 16 and below the outer extremities of the cutting areas 98 and 99. The drive sprocket 119 is coupled to a drive sprocket (not shown) which, in turn, is driven by a chain (not shown) from a sprocket 121 which is coupled to the shaft 37 through coupling 38. Thus, operation of the power input shaft 13 will operate the conveyor 25 through sprocket 34, chain 35, sprocket 36, shaft 37, coupling 38, sprocket 121 and the interconnecting chain and sprocket (not shown) which positively operate the drive sprocket 119 to move the continuous chain 118.

The conveyor 26 includes a supporting frame 122 which is pivotally mounted about an axis 123 provided at the drive sprocket 119 through a pair of spaced supporting panels 124. A drive pulley 125 includes an interconnected sprocket 126 which is coupled to sprocket 119 through a chain 127. A continuous belt 128 is driven by the drive pulley 125 and revolves about an outwardly positioned pulley 129. A pair of spaced side walls 130 are integrally joined with the conveyor frame 122 and prevent spillage of cut fibers from the belt 128. A rope or calbe 131 is attached to a pair of brackets 132 mounted at the outer ends of the side walls 130 and is secured through a series of pulleys 133 to a tie down bracket 134. In operation, the conveyor 26 operates in response to the operation of conveyor 25 through the positive interconnection provided by sprockets 119 and 126 and chain 127. An adjustment in the length of rope 131 will cause conveyor 26 to pivot about the axis 123 for raising or lowering the outer pulley 129 thereby adjusting the discharge point for the cut fibrous materials. The selectively variable conveyor 26 is extremely desirable where cut fibrous materials are to be deposited into feed bunks or other conveyors which are situated at different vertical locations. The conveyor 16 can be raised to a near vertical position when the processor 1 is moving through a building or other confined environment to prevent damage to the conveyor.

The conveyor 16 includes a pair of continuous drive chains 135 which are spaced with respect to each other with each chain 135 revolving about a rear mounted sprocket 136 and a front mounted drive sprocket 137. EAch chain 136 is supported along the longitudinal length of the bed 6 by an associated guide 138.

The false-end gate 17 includes a pair of spaced upwardly extending arms 139 which pivotally connect to an associated chain 135 as at 14. A cam follower 141 includes a pair of spaced triangularly shaped panels 142 each attached to a respective arm 139 with the two panels 142 interconnected by a cam follower 143. The lower surfaces 144 of the panels 142 generally engage the chain 16 or the bed 6 of the processor 1 so as to maintain the arms 139 in a canted position from the vertical. A mesh screen 145 is connected to the upper portion of the arms 139 and operates to engage the rear portion of a bale 96 in order to convey the bale toward and into the cutting assembly 14.

A pair of spaced cam plates 146 are connected to the bed 6 at the rear portion 18 of the bale processor 1. Each cam plate 146 includes an upwardly and rearwardly extending inclined surface 147. The pair of cam surfaces 147 are positioned to engage the bar 143 whenever the false-end gate 17 returns to the rear position at 18. As the bar 143 slides upwardly and rearwardly along the cam surface 147, the arms 139 and attached screen 145 rotate about the pivotal attachment at 140. When the false-end gate 17 is at the rear position 18, the arms 139 and screen 145 will be maintained at a substantially vertical position through the slideable connection between bar 143 and cam surfaces 147.

A limit switch 148 is connected to bed 6 at or adjacent to one of the sprockets 136 and provides a switch operator which is aligned within the path of a panel 142 provided by the false-end gate 17. Another limit switch 149 is connected to the bottom portion of bed 6 at or adjacent to one of the sprockets 136 and provides a switch operator which is positioned within the path of a projection 149A which, in turn, is attached to a return portion of one of the conveyor chains 16. The limit switches 148 and 149 are connected within a hydraulic control system to control the operation of the conveyor 16. A limit switch 150 is connected to bed 6 at or adjacent to one of the sprockets 136 and provides a switch operator which is aligned within the path of a panel 142 provided by the false-end gate 17. The limit switch 150 is connected within a hydraulic control system to control the operation of the lift 20.

Figure 12:
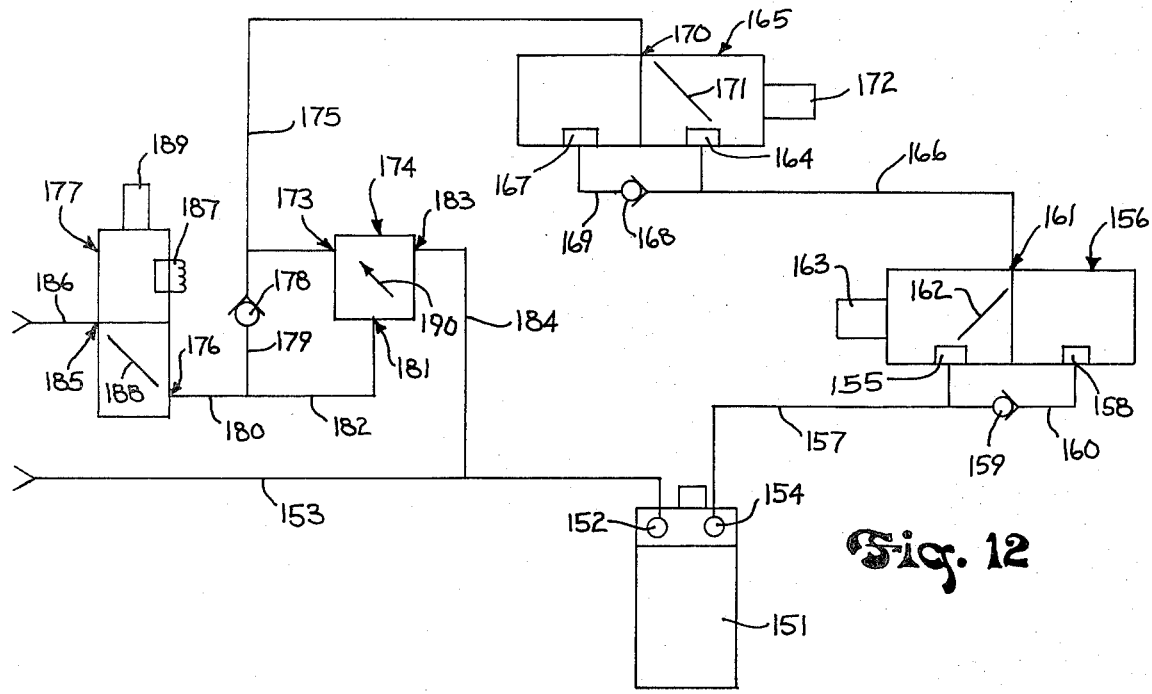
FIG. 12 is a schematic illustration showing the hydraulic system which operatively controls the input conveyor of the bale processor of FIG. 1.

The hydraulic control for operating the conveyor 16 is diagrammatically illustrated in FIG. 12 and includes a reversible hydraulic motor 151 providing an output (not shown) coupled to operatively drive the spaced sprockets 137. The hydraulic motor 151 is operated in a forward direction to move the conveyor chains 135 and attached false-end gate 17 from the rear position 18 to the forward position 19 for moving one or more bales 96 toward and into the cutting assembly 14. The hydraulic motor 151 is operated in a rearwardly direction to return the false-end gate 17 to the rear position 18 so that another bale may be transferred by lift 20 onto conveyor 16 and bed 6. Any one of a number of hydraulic fluids may be used to operate the motor 151, such as oil, for example. The hydraulic motor 151 includes a fluid port 152 which is coupled to a hydraulic power source such as supplied from a tractor or the like through a hose 153. A port 154 of motor 151 is connected to a port 155 of a reverse stop valve 156 through a conduit 157. The conduit 157 is also connected to a port 158 of the control valve 156 through a check valve 159 and connecting conduit 160. A port 161 of control valve 156 selectively communicates with either port 155 or port 158 depending upon the selective positioning of a control gate 162 in response to the operation of a valve operator illustrated at 163. The valve operator 163 is coupled to operate in response to the operation of the limit switch 148.

The port 161 of the reverse stop valve 156 is connected to a port 164 of a forward stop valve 165 through a conduit 166. The conduit 166 is also connected to a port 167 of valve 165 through a check valve 168 and connecting conduit 169. A port 170 of control valve 165 selectively communicates with either port 164 or 167 depending upon the selective positioning of a control gate 171 in response to the operation of a valve operator illustrated at 172. The valve operator 172 is coupled to operate in response to the operation of the limit switch 149.

The port 170 of the forward stop valve 165 is connected to a port 173 of a flow control valve 174 through a conduit 175. The conduit 175 is also connected to a port 176 of a safety interlock valve 177 through a check valve 178 and connecting conduits 179 and 180. A port 181 of the flow control valve 174 communicates with the conduit 180 and thus port 176 of the safety interlock valve 177 through a connecting conduit 182. A port 183 of the flow control valve 174 communicates with the hose 153 through a connecting conduit 184.

The safety interlock valve 177 provides a port 185 which communicates with the hydraulic system provided by a tractor other hydraulic flow source through a hose 186. The port 185 of the safety interlock valve 177 selectively communicates with either port 176 or a shut off position 187 depending upon the selective positioning of a control gate 188 in response to the operation of a valve operator illustrated at 189.

The safety interlock valve operator 189 may be coupled to a control rope for selective operation and such rope may be conveniently located at any one of a number of locations along the perimeter of the bale processor 1. with such construction, an operator when detecting any unsafe or abnormal condition may de-activate the conveyor 16 by pulling the control rope to thereby transfer gate 188 to the shut-off position 187. The flow control valve 174 provides a variable gate 190 which may be manually operated to vary the proportionate amount of hydraulic fluid being conducted between ports 181, 173 and 183. The selective manual operation of gate 190 provides a speed control for the hydraulic motor 151. With gate 190 positioned as shown in FIG. 12, a maximum speed condition for conveyor 16 exists because substantially all of the hydraulic fluid will flow between ports 181 and 173. If a slow speed condition is desired for conveyor 16, most of the hydraulic fluid will flow between ports 181 and 183. An infinite number of settings are provided by gate 190 for providing an infinite number of operating speeds.

Assuming that conveyor 16 is operating in a forward direction and is moving a bale 96 toward and into the cutting apparatus 14, hydraulic fluid under pressure is conducted from the tractor or other fluid source to the port 181 of the flow control valve 174 through hose 186, ports 185 and 176 of the safety interlock valve 177 and conduits 180 and 182. Assuming that conveyor 16 is operating at seventy-five percent of its maximum speed, gate 190 will be positioned so that approximately seventy-five percent of the hydraulic fluid supplied from port 181 will flow to port 173. The other twenty-five percent of hydraulic fluid will be-pass motor 151 and flow through port 183 to be returned to a hydraulic sump or reservoir provided by the tractor or other fluid source through conduit 184 and hose 153.

The fluid under pressure leaving port 173 will enter port 170 of the forward stop valve 165 through conduit 175. With the gate 171 positioned as shown in FIG. 12, fluid will flow in an unrestricted manner to port 161 of the reverse stop valve 156 through port 164 and conduit 166. With gate 162 positioned as shown in FIG. 12, fluid will flow in an unrestricted manner to port 154 of motor 151 and conduit 157. The hydraulic motor 151 thus operates in a conventional manner with fluid under pressure entering port 154 and leaving port 152 to be returned to the sump or reservoir through hose 153.

As the false-end gate 17 arrives at the forward position 19 immediately adjacent to the cutting assembly 14, the limit switch 149 is operated by projection 149A thereby operating the valve operator 172 and transferring the gate 171 from port 164 to port 167. With gate 171 transferred to port 167, all fluid flow through conduit 166 will cease and motor 151 will be de-activated because fluid flowing from port 167 to conduit 169 will not be permitted to pass the check valve 168.

To operate the conveyor 16 in a rearward direction, a four way control valve (not shown) located at the hydraulic source such as a tractor or the like is operated so that hose 153 receives hydraulic fluid under pressure and hose 186 conducts fluid to the sump or reservoir. In the reverse direction sequence of operation, hydraulic fluid under pressure will enter port 152 and exit from port 154 to thereby operate the motor 151 in a reverse direction. While the false-end gate 17 is at the forward position 19 and starting to travel in a rearward position, the fluid leaving port 154 will return to the sump or reservoir through hose 186 by travelling through a flow path including conduit 157, ports 155 and 161 of the reverse stop valve 156, conduit 166, check valve 168, conduit 169, ports 167 and 170, conduit 175, check valve 178, conduit 179 and 180, and ports 176 and 185 of the safety valve 177. Immediately after conveyor 16 leaves the forward position 19, the limit switch 149 is de-activated and the valve operator 172 operates through biasing such as springs or the like to the initial position thereby transferring gate 171 from port 167 to port 164. The fluid returning to the reservoir through hose 186 as supplied from port 154 of motor 151 will thereafter flow through the forward stop valve 165 via ports 164 and 170.

The conveyor 16 when operating in a rearward direction such as returning from the forward position 19 to the rear position 18 is operated at its top or maximum speed because fluid-by-passes the flow control valve 174 through the check valve 178. The false-end gate is therefore promptly returned to the rear position 18 for another operating sequence.

As the conveyor 16 returns to the rear position 18, the limit switch 148 is activated which operates the valve operator 163 and transfers the gate 162 from port 155 to port 158 thereby de-activating the motor 151. In such situation, the fluid leaving the port 154 will not be permitted to pass through the check valve 159 and conveyor 16 is maintained in a stopped condition at the rear position 18 and the bale processor 1 is readied for receiving another bale upon conveyor 16.

To initiate another operation of conveyor 16 in the forward direction, the four-way control valve is operated so that hose 186 will supply fluid under pressure and hose 153 will provide a return path. With the false-end gate 17 at the rear position 18 and starting a forward operation, fluid will initially flow through ports 161 and 158 of the reverse stop valve 156 and check valve 159 in order to enter the port 154 of motor 151. As the false-end gate 17 departs from the rear position 18, the limit switch 148 is deactivated and the valve operator 163 returns to its normal position through biasing such as springs or the like thereby transferring the gate from port 158 to port 155. The fluid flow thereafter is supplied to motor 151 to operate in the forward direction as previously described.

The arm 21 of hydraulic lift 20 is pivotably connected at 191 to a bracket 192 which, in turn, is attached to the frame 2. A hydraulic cylinder 193 contains a conventional piston 194 which is connected to the arm 21 through a rod 195. The selective operation of the hydraulic piston 194 operatively transfers the arm 21 between a lower position as at 196 illustrated in FIG. 9 and and upper position as at 197 illustrated in FIG. 11. As previously indicated, the lift 20 is transferred to the lower position 196 for permitting the fingers or projection 22 to slide under a bale 96 while located on the ground through the forward movement of the bale processor 1. The lift 20 is transferred to the upper position 197 in order to lift the bale 96 from the ground so that it may descend of drop by gravity upon the bed 6 and conveyor 16.

A supporting brace 198 is pivotally connected to the mounting plate 192 as at 191 and to arm 21 as at 199 and includes a shock absorber 200 for added strength and stability.

Figure 13:
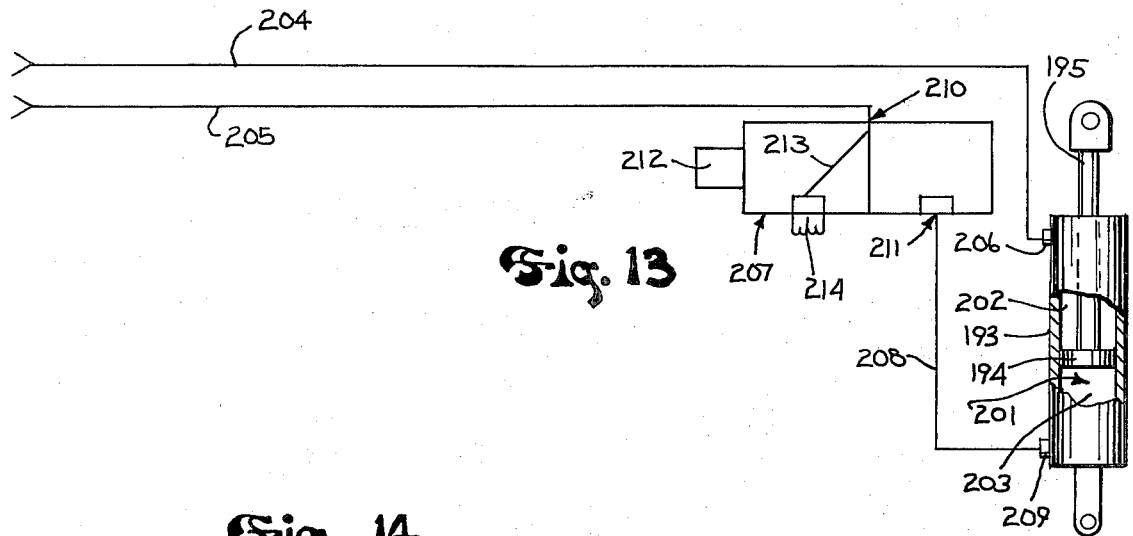
FIG. 13 is a schematic illustration showing the hydraulic system which operatively controls the hydraulic lift for transferring a bale onto the bale processor of FIG. 1.

FIG. 13 diagrammatically illustrates a hydraulic control for operating the piston 194 of lift 20. The cylinder 193 contains a chamber 201 which is separated by piston 194 into an upper chamber portion 202 and a lower chamber portion 203. A pair of hoses 204 and 205 are connected to a four-way valve (not shown) located at the hydraulic source such as at a tractor or the like and each can be selectively connected to either supply fluid under pressure or provide a return path to a sump or reservoir.

The hose 204 is connected directly to communicate with chamber portion 202 through a port 206. The hose 205 is connected through a bale lift sequence valve 207 and a connecting conduit 208 to a port 209 for communicating with the chamber portion 203. The sequence valve 207 includes a port 210 which communicates with hose 205 and a port 211 which communicated with conduit 208. A valve operator 212 is connected to operate with the limit switch 150 for selectively transferring a gate 213 between the port 211 and a valve shut-off position as indicated at 214. The valve operator 212 is spring biased to normally maintain the gate 213 at the shut-off position 214. In such manner, the piston 194 may only be moved when limit switch 150 has been activated by panel 142 while the false-end gate 17 is at the rear position 18. The valve operator 212 responds to the activation of limit switch 150 by the panel 142 and transfers the gate 213 transferred to port 211, for providing an unrestricted flow path between ports 210 and 211 so that fluid may be supplied to or from the chamber portion 203 to lower or raise the lift 20. With gate 213 transferred to port 211, fluid under pressure is supplied to chamber portion 202 to lower the arm 21 to the lower position 196 with the fluid in chamber portion 203 returning to the reservoir through hose 205. To raise arm 21 to the upper position 197, fluid under pressure is supplied to chamber portion 203 with the fluid in chamber portion 202 returning to the reservoir through hose 204.

The limit switch 150 provides a safety interlock for the operation of the hydraulic lift 20 by requirint that the false-end gate 17 be located at the rear position 18. As previously indicated, the false-end gate 17 is maintained at a substantial vertical position with respect to the bed 6 and conveyor 16 is supported by bar 143 and cam surfaces 147. Such safety interlock as provided by limit switch 150 precludes a bale lifting sequence whenever the conveyor 16 is moving between the rear position 18 and the forward position 19 which might otherwise damage the false-end gate 17. The vertical positioning of the arms 139 and screen 145 while at the rear position 18 is important because it permits movement of the supporting arm 198 without interference with the false-end gate 17. Furthermore, a lifted bale 96 is permitted to descent by gravity from the upper position 197 to the conveyor 16 and bed 6 without interference with the false-end gate 17. Thus, the hydraulic lift 20 may only be operated when the false-end gate 17 is at the rear position 18 and situated in a substantially vertical position to allow for a safe and convenient operation.

The canted orientation of the false-end gate 17, while travelling toward the cutting assembly 4, corresponds to the angular orientation of the cutting assembly 14 as represented by the angle "A". Such canting of the false-end gate 17 prevents interference between the false-end gate 17 and the cutting assembly 14 during the final stages of a cutting sequence. As a bale 96 becomes substantially disintegrated by the cutting assembly 14 through the progressive forward movement of conveyor 16 and attached false-end gate 17, the upper bale portion may topple into the cutting assembly and be disintegrated. At such stage of the cutting sequence, the variable gate 190 of the flow control valve 174 can be selectively adjusted to increase the speed of the conveyor 16 and attached false-end gate 17 to thereby speed up the final cutting action.

The variable gate 190 of the flow control valve 174 is also selectively varied to control the length of cut of the disintegrated fibrous materials. With the spider 55 and cutters 61 revolving at predetermined speeds and with conveyor 16 moving the bale 96 toward and into the cutting assembly 14 at a predetermined speed, the fibrous material of bale 96 will be cut to a predetermined length as indicated by the dimension "D" in FIG. 7. Such cut length as indicated by "D" extends roughly in the direction of the bale axis 97. If a longer cut is desired thereby increasing the dimension "D", the speed of the conveyor 16 is increased by adjusting the gate 190 of the flow control valve 174 as previously described. If the length of cut "D" is to be shortened, the speed of the conveyor 16 is decreased through the adjustment of gate 190 of the flow control valves as previously described. In such manner, a highly regulated length of cut for the disintegrated fibrous material is provided and can be adjusted to provide differing fineness of disintegrated fibrous material according to varying conditions of usage.

The length of cut "D" can also be varied by varying the rotational speed of the input shaft 13. With the conveyor 16 operating at a substantially constant speed to bring a bale 96 toward and into the cutting assembly 14, the rotational speed of spider 55 may be varied in direct response to the variance of rotational speed of the input shaft 13. In such manner, the rotational speed of the cutters 61 about the spider shaft 44 will vary in direct proportion to varying speed of shaft 13. An increase speed of rotation of the cutters 61 about shaft 44 will decrease the length of cut "D" while a decrease of rotational speed of cutters 61 will increase the length of cut "D".

The length of cut "D" can also be regulated for a given speed of cutting operation by pre-selecting the number and therefore the spacing of the cutter blades 85. A greater number and therefore closer spacing of the blades 85 will decrease the length of cut "D". A lesser number of blades 85 will increase the length of cut "D" because of the greater spacing between adjacent blades 85.

Figure 14:
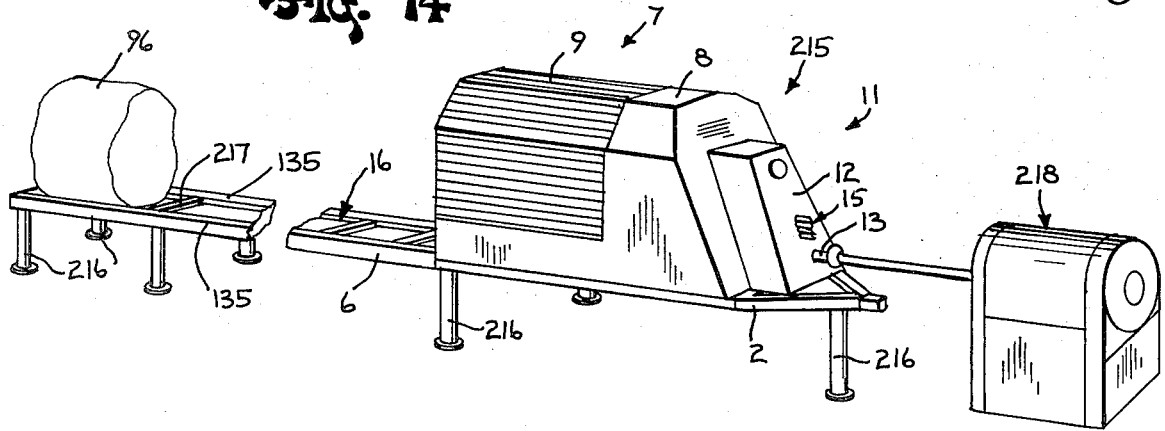
FIG. 14 is a perspective view of a fixed bale processor incorporating certain aspects of the present invention.

FIG. 14 illustrates another embodiment and shows a bale processor 215 which incorporates many of the features of the bale processor 1. In that the constructions of processor 1 and processor 215 are substantially identical, identical numbers will be used to designate identical parts and only the modifications will be described in detail.

Basically, the processor 215 is identical to processor 1 except that the wheels and axle have been replaced by fixed supports 216 for permanent installation. The hydraulic lift has been omitted, and the conveyor 16 has been extended and modified to provide continuous forward motion. A series of bale engaging flights 217 have been added and interconnect the chains 135. Thus the bale 96 is conducted toward and into the cutting assembly 14 by the chains 135 and interconnected flights 217. A permanently installed motor 218 is illustrated although a power take-off from a tractor could be connected to operate the input shaft 13 as previously described.

In stationary operation, bales such as at 96 are placed upon the continuous conveyor 16 to be conducted toward and into the cutting assembly 14. In one desired sequence of operation, a series of bales are placed upon the continuous conveyor 16 to be in an abutting relationship to one another. In such manner, each succeeding bale will functionally operate as a "false-end gate" and operatively prevent the upper rear or trailing portion of a preceeding bale from toppling rearwardly as it nears the cutting assembly 14.

We claim:

1. An apparatus for disintegrating a bale of fibrous material, comprising a plurality of cutters each including a plurality of blades extending outward from an axis to be directed generally towards a bale, each of said cutters including a plate having a concave outer surface formed about said axis and generally facing said bale and an outer edge with a plurality of mounting projections each connected to one of said blades with said plurality of blades extending radially and axially outward from said plate to be directed toward an oncoming bale, means rotating said plurality of cutters about their said axii, and means connected to said bale and said cutters to provide relative movement between said bale and said cutters along a movement axis to selectively engage said blades against said bale to cut said fibrous material by said blades at a face of said bale.

2. An apparatus for disintegrating a bale of fibrous material, comprising a supporting structure, a spider connected to said supporting structure for rotation about a first axis to be directed generally toward a bale of fibrous material, a plurality of cutters each directly rotatably connected to said spider for selective rotation about a second axis canted from the normal to a plane containing said spider, means connected for selectively rotating said spider and said cutters, and means providing relative movement between said bale and said cutters along a movement axis, said bale being engaged by said cutters rotating about said first axis and disintegrating said bale for providing disintegrated fibrous material.

3. An apparatus for disintegrating a bale of fibrous material, comprising a member for supporting a bale of fibrous material to be processed, an assembly for disintegrating said bale and providing cut fibrous material, and means for providing relative movement between said bale and said disintegrating assembly along a movement axis for the engagement of said bale by said disintegrating assembly, said bale disintegrating assembly including a cutter providing a dish shaped plate with an axis directed generally toward said bale and having a concave outer surface facing said bale and an outer circumferential edge with a plurality of circumferentially space mounting projections spaced by intervening recesses and a plurality of sickle type cutter blades each removably connected to one of said plurality of mounting projections with each of said blades extending radially and axially outward from said plate to be directed toward an oncoming bale, each of said blades having a substantially triangularly shaped portion providing a pair of oppositely facing side cutting edges communicating with an outwardly disposed end cutting edge positioned substantially normal to a radial of said plate with one of said side cutting edges intersecting with said end cutting edge to form a cutting point, and means rotating said cutter about said axis for revolving said plurality of circumferentially spaced cutting points and cutting said fibrous material at a face of said bale, said plurality of cutting points rotating in a first plane angularly oriented with respect to a second plane normal to said movement axis so that at least one of said cutting points is spaced in relief from said bale face when another of said cutting points engages said bale face.

4. An apparatus for disintegrating fibrous material, comprising a supporting structure, a first member connected to said supporting structure for rotation about a first axis to be directed generally toward a bale of fibrous material, a second member with a bale disintegrating portion rotatably connected to said first member for selective rotation about a second axis spaced by a first predetermined distance from said first axis and to be directed generally toward said bale with said second member operating in a first pre-defined bale disintegrating area, a third member with a bale disintegrating portion rotatably connected to said first member for selective rotation about a third axis spaced by a second predetermined distance from said first axis to be directed generally toward said bale with said third member operating in a second pre-defined bale disintegrating area different than said first area, means connected for selectively rotating said first, second and third members, and means providing relative movement between said bale and said second rotary member along a movement axis, said bale being engaged by said second and third rotary members rotating about said first axis to disintegrate at least a portion of said bale for providing disintegrated fibrous material.

5. An apparatus for disintegrating fibrous material, comprising a supporting structure, a first member connected to said supporting structure for rotation about a first axis to be directed generally toward a bale of fibrous material, a second member with a bale disintegrating portion spaced from said first axis along a first radial line and rotatably connected to said first member for selective rotation about a second axis to be directed generally toward said bale, third and fourth members each with a bale disintegrating portion rotatably mounted to said first member for selective rotation about third and fourth axes, respectively, directed generally toward said bale, said third and fourth rotary members being spaced from said first axis along second and third radial lines, respectively, with said first, second and third radial lines being substantially equally circumferentially spaced, means connected for selectively rotating said first, second, third and fourth members, and means providing relative movement between said bale and said second rotary member along a movement axis, said bale being engaged by said second, third and fourth rotary members rotating about said first axis to disintegrate at least a portion of said bale for providing disintegrated fibrous material.

6. The apparatus of claim 5, wherein said second axis is radially spaced by a first predetermined distance from said first axis, and said third and fourth axes are radially spaced from said first axis by a second predetermined distance different than said first distance.

7. An apparatus for disintegrating a bale of fibrous material, comprising a supporting structure, a first member connected to said supporting structure for rotation about a first axis to be directed generally toward a bale of fibrous material, a second member with a bale disintegrating portion rotatably connected to said first member for selective rotation about a second axis to be directed generally toward said bale, said second member includes a cutter providing a plate having a concave surface about said second axis to be directed toward said bale and an outer edge with a plurality of mounting projections, and a plurality of blades each removably connected to one of said mounting projections to extend radially and axially outward from said plate and toward said bale, means connected for selectively rotating said first and second members and revolving said plurality of blades to cut said fibrous material along a face of said bale, and means providing relative movement between said bale and said second rotary member along a movement axis, said bale being engaged by said second rotary member rotating about said first axis to disintegrate at least a portion of said bale for providing disintegrated fibrous material.

8. The apparatus of claim 7, wherein one of said blades includes a substantially triangularly shaped portion providing a pair of oppositely facing side cutting edges communicating with an outwardly disposed end cutting edge positioned substantially normal to a radial of said plate with one of said side cutting edges intersecting with said end cutting edge and forming a cutting point for cutting said fibrous material along the face of said bale.

9. An apparatus for disintegrating fibrous material, comprising a supporting structure, a first member connected to said supporting structure for rotation about a first axis to be directed generally toward a bale of fibrous material, a second member with a bale disintegrating portion rotatably connected to said first member for selective rotation about a second axis to be directed generally toward said bale, means connected for selectively rotating said first and second members, and means providing relative movement between said bale and said second rotary member including a conveyor mounted upon a bed and having a first end spaced immediately adjacent to said second rotary member and a second end remotely spaced from said second rotary member, said conveyor including a reversible drive and a false end gate selectively operable between a first position adjacent said first end and a second position adjacent said second end in response to the operation of said reversible drive, said false end gate selectively operable to said second position for receiving a bale upon said bed and selectively operable to said first position for engaging and moving said bale toward and into said second rotary member with said bale being engaged by said second rotary member rotating about said first axis to disintegrate at least a portion of said bale into disintegrated fibrous material.

10. The apparatus of claim 4, wherein said conveyor provides bale movement along a movement axis and said second rotary member rotates about said first axis within a disintegrating plane spaced by a first predetermined angle from a reference plane normal to said movement axis, said false end gate canted from the normal with respect to said conveyor bed and generally at said first predetermined angle.

11. The apparatus of claim 9, wherein said reversible drive includes a reversible hydraulic motor selectively operable in response to a manually actuable hydraulic control and connected to operate said conveyor between said first and second positions, said hydraulic control including a hydraulic fluid source and a fluid reservoir connected through means for conducting said hydraulic fluid to and from said motor for operating said conveyor, said connecting means including a variable valve for selectively by-passing pre-selected portions of said hydraulic fluid from said fluid source to said fluid reservoir and by-passing said hydraulic motor for controlling the speed of said conveyor.

12. The apparatus of claim 9, and including a bale lift operatively connected to said conveyor bed and operable between a lower position for engaging said bale and an upper position for placing said bale upon said conveyor bed.

13. The apparatus of claim 12, wherein said false end gate is pivotally mounted to a continuous chain provided by said conveyor and selectively rotates between a canted bale engaging position and a substantially normal position with respect to said conveyor bed, said false end gate including a cam follower selectively engaging a cam surface connected to said conveyor bed in response to said false end gate moving to said second position and rotating said false end gate from said canted position to said substantially normal position for permitting the operation of said bale lifting arm.

14. The apparatus of claim 12, and including a lift control for selectively operating said bale lift between said lower and upper positions and including a switch located adjacent to said conveyor and operable to a first position in response to said false end gate at said second position for permitting selective operation of said bale lift and operable to a second position in response to said false end gate at a location spaced from said second position for disabling said bale lift.

15. A bale disintegrating apparatus, comprising a member for supporting a bale of fibrous material to be processed, an assembly for disintegrating said bale and providing cut fibrous material, and means for providing relative movement between said bale and said disintegrating assembly and along a movement axis for the engagement of said bale by said disintegrating assembly, said bale disintegrating assembly including a spider mounted for rotation about an axis directed generally toward said bale, first, second and third cutters generally facing said bale and mounted to said spider for rotation at first, second and third axes, respectively, with said first cutter axis spaced along a first radial line by a first predetermined distance from said spider axis and said second and third cutter axes spaced along second and third radial lines, respectively, by a second predetermined distance from said spider axis with said second distance being greater than said first distance and said first, second and third radial lines substantially equally circumferentially spaced, each of said cutters having a radially spaced cutting edge rotating about said cutter axis, means operatively rotating said spider and rotating said first, second and third cutters within a common plane about said spider axis with said first cutter operating within a first cutting area and said second and third cutters operating in a second cutting area, said common plane angularly orientated with respect to a reference plane normal to said movement axis with the upper portion of said common plane canted toward said bale.

* * * * *

UNITED STATES PATENT AND TRADEMARK OFFICE
CERTIFICATE OF CORRECTION

PATENT NO. : 4,227,654

DATED : October 14, 1980

INVENTOR(S) : DEAN E. SEEFELD et al

It is certified that error appears in the above—identified patent and that said Letters Patent is hereby corrected as shown below:

| | |
|---|---|
| Abstract, Line 10 | cancel "a" and substitute therefor ---the--- |
| Column 2, Line 15 | cancel "cutter" and substitute therefor ---cutting--- |
| Column 4, Line 2 | cancel "cnfiguration" and substitute therefor ---configuration--- |
| Column 9, Line 17 | cancel "communicates" and substitute therefor ---communicate--- |
| Column 9, Line 46 | cancel "falseend" and substitute therefor ---false end--- |
| Column 10, Line 9 | cancel "98" and substitute therefor ---99--- |

UNITED STATES PATENT AND TRADEMARK OFFICE
CERTIFICATE OF CORRECTION

PATENT NO. : 4,227,654
DATED : October 14, 1980
INVENTOR(S) : DEAN E. SEEFELD et al It is certified that error appears in the above—identified patent and that said Letters Patent is hereby corrected as shown below:

Column 10, Line 36    cancel "onto" and substitute therefor ---into---

Column 12, Line 23    cancel "calbe" and substitute therefor ---cable---

Column 12, Line 44    cancel "EAch" and substitute therefor "Each"

Column 14, Line 43    cancel "be-pass" and substitute therefor --by-pass---

Column 15, Line 27    cancel "fluid-by-passes" and substitute therefor ---fluid by-passes---

Column 16, Line 1    cancel "of" and substitute therefor ---or---

UNITED STATES PATENT AND TRADEMARK OFFICE
CERTIFICATE OF CORRECTION

PATENT NO. : 4,227,654

DATED : October 14, 1980

INVENTOR(S) : DEAN E. SEEFELD, et al

It is certified that error appears in the above—identified patent and that said Letters Patent is hereby corrected as shown below:

Column 16, Line 52    cancel "is" and
                      substitute therefor ---as---

Column 16, Line 62    cancel "descent" and
                      substitute therefor ---descend---

Column 17, Line 2     cancel "4" and
                      substitute therefor ---14---

Signed and Sealed this

Sixteenth Day of March 1982

[SEAL]

Attest:

GERALD J. MOSSINGHOFF

Attesting Officer    Commissioner of Patents and Trademarks